M. L. H. SMITH.
Art of Illustrating Books.
No. 229,016.   Patented June 22, 1880.
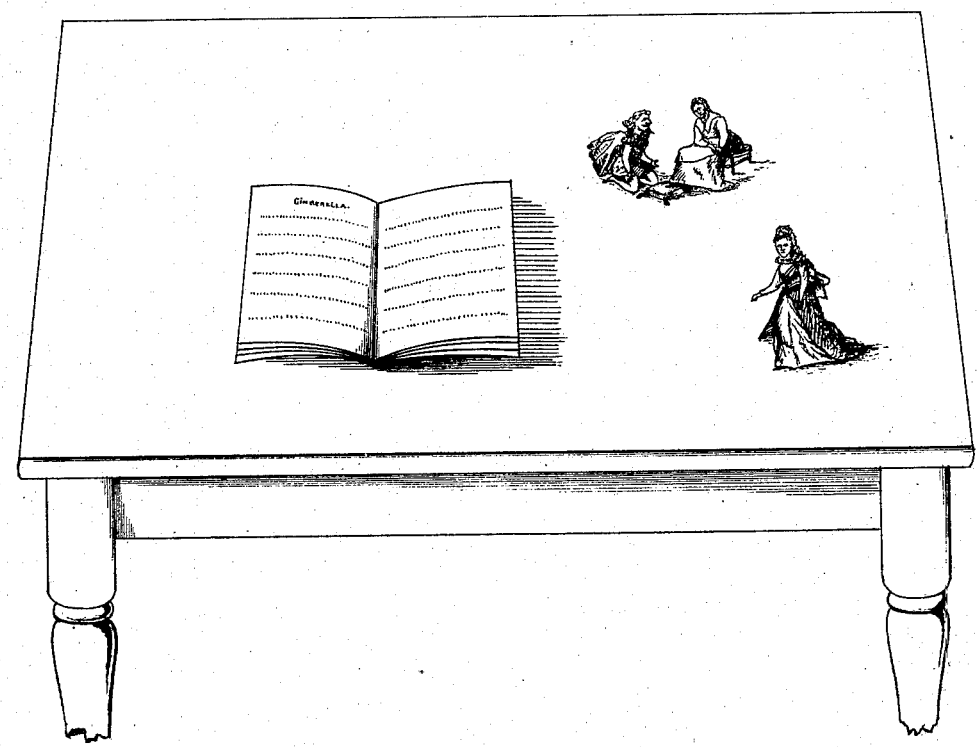
WITNESSES
Marion L. H. Smith
INVENTOR by
Geo. A. Sawyer.
ATTORNEY

UNITED STATES PATENT OFFICE.

MARION L. H. SMITH, OF WISCASSET, MAINE.

ART OF ILLUSTRATING BOOKS.

SPECIFICATION forming part of Letters Patent No. 229,016, dated June 22, 1880.

Application filed October 11, 1879.

*To all whom it may concern:*

Be it known that I, MARION L. H. SMITH, of Wiscasset, in the county of Lincoln and State of Maine, have invented certain new and useful Improvements in Illustrating Printed Books; and I do hereby declare that the following is a full, clear, and exact description of the invention, which will enable others skilled in the art to which it appertains to make and use the same, reference being had to the accompanying drawing, and to the letters of reference marked thereon, which forms a part of this specification.

The object of this invention is to furnish a new and improved method of illustrating printed books, especially children's books, which will combine amusement and instruction; and it consists, essentially, in printing the text and illustrations separately, the latter on removable or detachable sheets, so that the figures or characters described in the text may be removed and set upright on a table or mimic stage and used as puppets to enact the story.

In the drawing the figure shows an ordinary child's story-book printed on sheets and bound up, as usual, with figures descriptive of the text cut out and set upright as puppets or dolls to be played with. These figures may be—as, for instance, in the story of Cinderella—of Cinderella herself, the wicked sisters, the fairy godmother, the pumpkin coach and mice horses, the prince, &c., in individual characters, groups, or otherwise arranged, according to the taste and judgment of the artist, and are printed on separate sheets, and cut out or separated from the blank paper margin upon which they are printed, and they may be conveniently placed in a flap arranged in the cover of the book for their reception.

Besides figures of personages the illustrations may show also appropriate scenery—as, for instance, of the ball-room—to set off groups of all the characters.

When the figures are cut out to be played with a flap of stiff paper may be pasted at the back, which will hold them in an upright position; or any other convenient device may be used for the same purpose.

This method of illustration is especially applicable to books in the narrative form, whether the text be in prose or in verse, or whether the text be partially in the narrative form and partially in dialogue, rejecting the absolute dialogue form as unsuitable to children of the age for which these books are designed; and it is immaterial, so far as the principle of my invention is concerned, whether the text and illustrations be printed on sheets of the same size or not, though for ordinary commercial purposes it is probably preferable that they should be so.

I do not desire to limit myself to any particular form of illustration, whether plain or colored, single characters or groups, with or without scenery, or whether they be larger or smaller than the sheets of text; but,

Having thus described my invention, what I claim as new, and desire to secure by Letters Patent, is—

As a new article of manufacture, a child's book provided with printed text and illustrated by pictures of the characters or personages described, the latter cut out as puppets and adapted to be used to enact the story, substantially as described.

In testimony that I claim the foregoing as my own I affix my signature in presence of two witnesses.

MARION L. H. SMITH.

Witnesses:
GEORGE A. SAWYER,
WARREN BROWN.